US008050691B2

(12) United States Patent
Kangas

(10) Patent No.: US 8,050,691 B2
(45) Date of Patent: Nov. 1, 2011

(54) METHOD AND ARRANGEMENTS IN A MOBILE TELECOMMUNICATION NETWORK

(75) Inventor: Ari Kangas, Lidingo (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 931 days.

(21) Appl. No.: 12/063,529

(22) PCT Filed: Aug. 2, 2006

(86) PCT No.: PCT/EP2006/064928
§ 371 (c)(1),
(2), (4) Date: Feb. 11, 2008

(87) PCT Pub. No.: WO2007/017421
PCT Pub. Date: Feb. 15, 2007

(65) Prior Publication Data
US 2010/0173645 A1    Jul. 8, 2010

Related U.S. Application Data

(60) Provisional application No. 60/707,159, filed on Aug. 11, 2005.

(30) Foreign Application Priority Data

Aug. 11, 2005   (SE) ..................................... 0501799

(51) Int. Cl.
*H04W 24/00* (2009.01)
(52) U.S. Cl. ...................... 455/456.1; 455/457; 342/352;
342/357.2; 342/357.23; 342/357.28; 342/357.39;
342/357.63; 342/357.41; 342/357.78; 342/405;
342/418

(58) Field of Classification Search ............... 455/456.1, 455/457; 342/352, 357.2, 357.23, 357.28, 342/357.39, 357.63, 357.41, 357.78, 405, 342/418
See application file for complete search history.

(56) References Cited

U.S. PATENT DOCUMENTS

| 6,665,539 | B2 * | 12/2003 | Sih et al. ..................... 455/456.3 |
| 6,718,174 | B2 * | 4/2004 | Vayanos ..................... 455/456.1 |
| 6,917,331 | B2 * | 7/2005 | Gronemeyer .................. 342/378 |
| 7,359,429 | B2 * | 4/2008 | Valio et al. ..................... 375/142 |
| 7,486,749 | B2 * | 2/2009 | Pietila et al. ................... 375/343 |
| 7,548,199 | B2 * | 6/2009 | Winternitz et al. ....... 342/357.63 |
| 7,876,738 | B2 * | 1/2011 | Akopian et al. .............. 370/342 |
| 2005/0016201 | A1 | 1/2005 | Ivanov et al. |
| 2005/0080561 | A1 * | 4/2005 | Abraham et al. ............. 701/213 |
| 2006/0114984 | A1 * | 6/2006 | Gaal et al. ..................... 375/240 |

* cited by examiner

*Primary Examiner* — Kwasi Karikari
(74) *Attorney, Agent, or Firm* — Roger S. Burleigh

(57) ABSTRACT

The present invention relates to a method and an arrangement in a mobile telecommunication network for detection of a UE transmitted signal. The arrangement comprises means for detecting the signal during the time $t_{tot}$, wherein said means comprises a correlator adapted for combined coherent and non-coherent correlation, wherein the length of the coherent correlation interval is L signal samples, the number of coherent correlation intervals is M and the coherent correlation results in a coherent correlation result for each of the coherent detection intervals M, and means for adding the coherent correlation results non-coherently. Further, the arrangement comprises means for selecting one of the length L of coherent detection interval and the total detection interval $t_{tot}$ based on at least one of the parameters cell size, UE speed and acceleration, number of participating Location Measurements Units and a desired total false alarm rate.

11 Claims, 3 Drawing Sheets

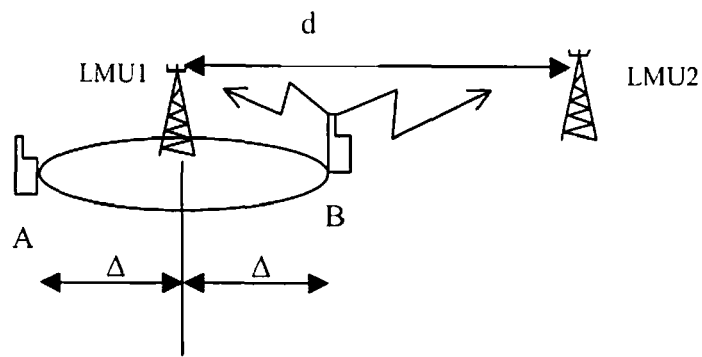
Fig. 3
Fig. 4a
Fig. 4b
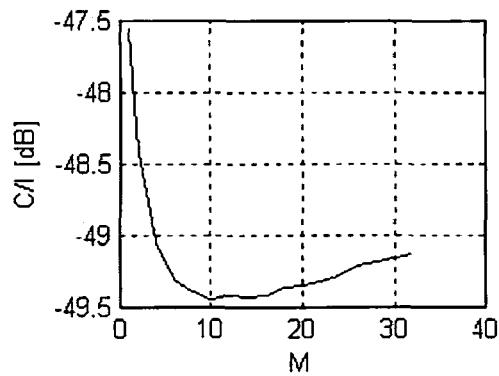
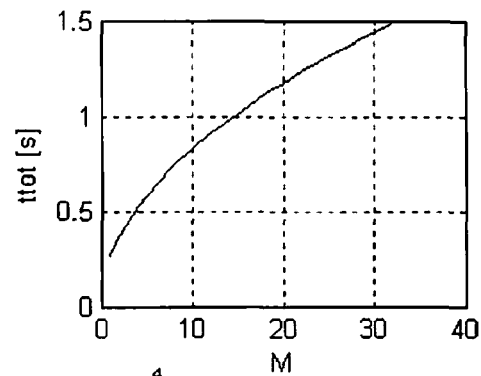
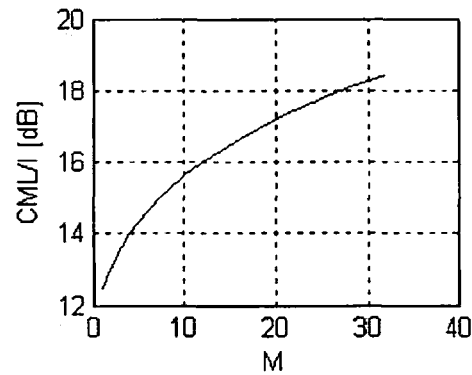
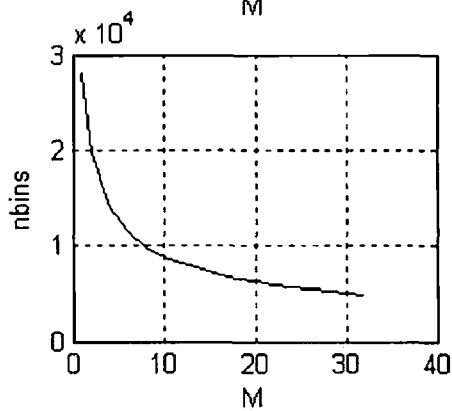
Fig. 4c
Fig. 4d
Fig. 4a-4d Select one of the length L of coherent correlation interval and a total detection interval $t_{tot}$ based on at least one of the parameters cell size, UE speed and acceleration, number of participating Location Measurements Units and a desired total false alarm rate.

METHOD AND ARRANGEMENTS IN A MOBILE TELECOMMUNICATION NETWORK

CROSS-REFERENCE TO RELATED APPLICATIONS

This application claims the benefit of US Provisional Application No. 60/707,159, filed Aug. 11, 2005, the disclosure of which is fully incorporated herein by reference.

FIELD OF THE INVENTION

The present invention relates to a mobile telecommunication network. In particular, the present invention relates to method and arrangements for detecting signals, e.g. for performing positioning of User Equipments (UE) in the mobile telecommunication network.

BACKGROUND

Uplink Time Difference of Arrival (UTDOA) is a positioning method based on time of arrival techniques. Such techniques are described in the 3GPP specifications 3GPP RP-040387, WID: Inclusion of Uplink TDOA UE positioning method in the UTRAN specifications and 3GPP R4-040412, Inclusion of Uplink TDOA UE positioning method in the UTRAN specifications; TruePosition.

In the UTDOA positioning method, Location Measurement Units (LMU), usually associated with radio base stations measure the time of arrival of UE transmitted signals and the UE location can be computed when at least three LMUs are able to detect the UE signal. Signal detection is normally done by correlating the received signal against a known signal replica for all possible delays and doppler shifts. This is in practice done by using discrete steps, also referred to as "bins", in the delay and doppler domain.

Furthermore, correlations are normally done in two steps. First, coherent correlation is done (i.e. using both inphase and quadrature components) in order to optimally suppress noise. Subsequently, different segments of coherent correlation results can be added non-coherently, ie the individual coherent correlation results are absolute-squared, followed by a summation. Non-coherent correlation may e.g. become necessary whenever the signal phase changes too much between two coherent correlation segments. Once the correct delay/doppler bin has been identified, a finer search may be done in order to increase the accuracy.

According to the current standard as described in the above cited 3GPP specifications, it is assumed that coherent correlation is done during the whole signal duration. For a stationary UE, this provides the best sensitivity for a given measurement interval. However, when UE acceleration is taken into account the maximum coherent correlation time is limited by the change in doppler during the measurement interval. Therefore it would be desirable to achieve a method and arrangement for detecting a signal for the scenario when the UE accelerates.

Thus, the object of the present invention is to improve sensitivity and to avoid unnecessary processing during an acceleration of the UE.

SUMMARY OF THE INVENTION

This and other objects are achieved according to the present invention by providing an arrangement, method and computer program products having the features defined in the independent claims. Preferred embodiments are defined by the depending claims.

The arrangement according to the present invention in a mobile telecommunication network for detection of a UE transmitted signal comprising means for selecting one of the length L of coherent correlation interval and a total detection interval $t_{tot}$ based on at least one of the parameters cell size, UE speed and acceleration, number of participating Location Measurements Units and a desired total false alarm rate, makes it possible to improve sensitivity and to avoid unnecessary processing.

The method in a mobile telecommunication network for detection of a UE transmitted signal according to the present invention comprising the step of selecting one of the length L of coherent correlation interval and a total detection interval $t_{tot}$ based on at least one of the parameters cell size, UE speed and acceleration, number of participating Location Measurements Units and a desired total false alarm rate, makes it possible to improve sensitivity and to avoid unnecessary processing.

According to an embodiment of the present invention, the coherent correlation interval is based on at least one of the parameters cell size, UE speed and acceleration, number of participating LMUs and a desired total false alarm rate.

According to a further embodiment of the present invention, the total detection interval $t_{tot}$ is based on at least one of the parameters cell size, UE speed and acceleration, number of participating LMUs and a desired total false alarm rate.

According to a further embodiment of the present invention the means for detecting is located in a LMU.

According to a further embodiment of the present invention, the means for selecting is located in a Serving Mobile Location Center.

According to an alternative embodiment of the present invention, the means for selecting is located in a LMU.

According to a further embodiment of the present invention, the maximum total detection interval $t_{tot}$ is a predetermined value.

According to a further embodiment of the present invention, the predetermined value is dependent on a maximal allowed response time.

An advantage with the present invention is that the sensitivity (ie coverage) of the UTDOA method is increased by approximately 2 dB compared to prior art. If signal strength decays according to $35\log_{10}(\text{distance})$ is assumed, that can be translated into 30% better area coverage for each LMU.

A further advantage of one embodiment of the present invention is that it defines the maximum useful time for measurements which results in that waste of processing resources and delays are avoided.

DRAWINGS

FIG. 3 shows schematically the geometry for delay uncertainty calculation.

FIGS. 4a-4d show C/I thresholds, total measurement time $t_{tot}$, total number of search bins, and the number of non-coherent integrations, respectively, as a function of M.

FIG. 5 shows a flow chart illustrating the method according to the present invention.

DETAILED DESCRIPTION

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
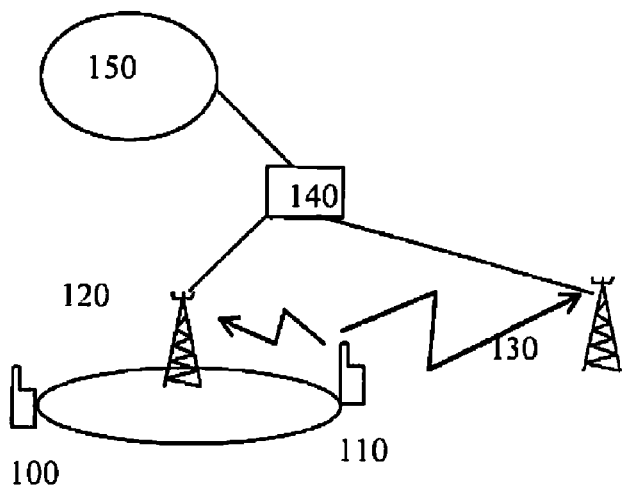
FIG. 1 shows a mobile telecommunication network wherein the present invention may be implemented.

The method and arrangements of the present invention may be implemented in a conventional mobile telecommunication network as shown in FIG. 1. Such a network comprises radio base stations 120, 130 adapted to communicate wirelessly with User Equipments 100, 110. Each radio base station is preferably associated with at least one LMU. The radio base stations 120, 130 are further connected to a radio network controller (RNC) 140 and the RNC 140 is further connected to a Core Network (CN) 150, wherein the CN connects different networks. The mobile telecommunication network also comprises a Serving Mobile Location Center (SMLC) adapted to receive a positioning inquiry from the CN/RNC. Preferably, the SMLC requests e.g. information regarding the radio parameters, giving the LMU order to perform measurements, receives measurements, calculating the position based on time measurements and LMU coordinates, and delivering the position to the RNC/CN.

As stated above, detection of signal may be performed by coherent correlation and non-coherent correlation. The present invention is based on that there is an optimal choice the length of the coherent part. The optimal choice is dependent on parameters cell size, UE speed and acceleration, number of participating LMUs and desired total false alarm rate. A false alarm occurs when an LMU declares that the signal arrived at a particular time, whereas in reality the signal arrived at a different time, ie the measurement is faulty. False alarms typically occur when the signal is too weak to be detected by that particular LMU. The total false alarm rate is the probability that at least one LMU reports a faulty measurement. False alarms are further discussed below.

The present invention is further based on that there is an optimal choice of the total measurement time for performing detection of the signal, i.e. correlating the signal.

Thus the present invention relates to a method and arrangements in a mobile telecommunication network for detection of a UE transmitted signal. The arrangement comprises means for detecting the signal during the time $t_{tot}$, wherein said means comprises a correlator adapted for combined coherent and non-coherent correlation. The length of the coherent correlation interval is L signal samples, the number of coherent correlation intervals is M and the coherent correlation results in a coherent correlation result for each of the coherent detection intervals M. Further, the arrangement comprises means for adding the coherent correlation results non-coherently. According to the present invention, the arrangement comprises means for selecting one of the length L of coherent detection interval and the total detection interval $t_{tot}$ based on at least one of the parameters cell size, UE speed and acceleration, number of participating Location Measurements Units and a desired total false alarm rate. These parameters are normally known at the time of deployment but may also be altered when requirements or the network environment changes.

Below, the length of the coherent detection denoted L and the requirements for the maximal total measurement time denoted $t_{tot}$ for signal detection is determined.

Figure 2:
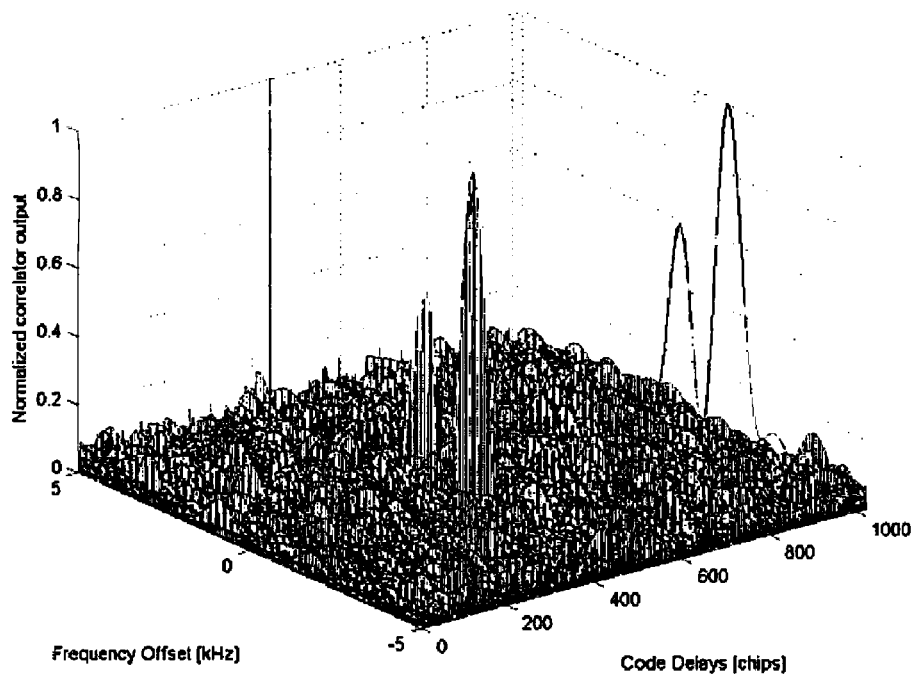
FIG. 2 shows an exemplary correlator output.

The UTDOA LMU measures the time of arrival of UE signals. A model of the received waveform is $$y(t)=A\,s(t-\tau)e^{i2\pi ft}+e(t), t\in(0,(N+\tau_{win})t_c) \quad (1)$$

where A is the (complex) signal amplitude, s(t) is the UE transmitted signal, which is assumed to be known. τ is the arrival time, or equivalently, the delay of the signal, ie the quantity that we are interested in, and f is the residual doppler frequency. $t_c$ is the chip rate. e(t) is the sum of interference and noise with a variance of I and $N+\tau_{win}$ is the duration of the received signal, measured in chip units. It is known apriori that the delay τ is in the interval 0 to $\tau_{max}$ chips and that the residual doppler is in the range 0 to $f_{max}$ Hz. Signal detection is normally done using correlations against all possible shifts of τ and f, see FIG. 2. This is in practice done in discrete steps over the delay/doppler space which e.g. results in that:

$$\tau_p = p\Delta\tau,\, p=0,\ldots,\tau_{max}t_c/\Delta\tau \quad (2)$$

$$f_q = q\Delta f,\, q=0,\ldots,f_{max}/\Delta f \quad (3)$$

The correlation is done as follows. The N samples long replica s(t) is split into M segments of L samples each, i.e., L is the length of the coherent detection. Correlating a frequency-shifted y(t) coherently against the M segments of s(t) yields $$r_m(p,q) = \frac{1}{L}\sum_{k=1}^{L} y\!\left(\begin{array}{c}kt_c+\\p\Delta t+mLt_c\end{array}\right)\exp\!\left(-i2\pi q\Delta f\!\left(\frac{kt_c+}{mLt_c}\right)\right)s(kt_c+mLt_c)^* \quad (4)$$

(note that x* means complex conjugate of x) and summing M correlation results non-coherently gives $$R(p,q) = \sum_{m=1}^{M} r_m(p,q) r_m(p,q)^* \quad (5)$$

Define a test quantity $$\lambda = R(p,q)L/I \quad (6)$$

where an estimate of the variance I is assumed to be available. Note that for the correct delay/doppler shift $$R(p,q) \sim CM+(M/L)I \quad (7)$$

where C=AA*(Es(t)s(t)*) is the received desired signal power, which implies that whenever CM>>(M/L), ie when CL/I>>1, then λ=CML/I which can be interpreted as the signal to noise ratio including processing gain factor ML. (E is the expected value.) The calculated λ is compared with a threshold λ* and whenever λ>λ* it is determined that the signal is present.

It is important that the detection threshold λ* is carefully selected to avoid false alarms. False alarms are much more detrimental to positioning than to communication. In communication, synchronization is followed by an attempt to decode the received data. Any error in the synchronization step will then be detected, as it will not be possible to decode data. For positioning such a decoding step is not performed, therefore the false alarm rates have to be much lower. The LMU has to search a large number of delay/doppler bins while maintaining an overall low false alarm probability. In addition, a number of LMUs are tasked to search for the signal and as stated above it is desired to keep overall false alarm rate low. Therefore the per bin false alarm probabilities must be kept very low, in the order of $10^{-7}$ or less for the examples shown in this application.

The grid sizes Δt, Δf depends on the correlation function of the desired signal and the length of the coherent integration interval $Lt_c$. If $Es(mt_c)s^*(nt_c)=0$, for any integers m≠n, then the correlation function in the delay domain is zero whenever $|\tau-\tau_p|>t_c$, and in the doppler domain it is sinc-shaped with the first null at $|f-f_q|=1/Lt_c$. $\Delta f=2/(3Lt_c)$ is usually chosen in order not to lose too much correlation energy, i.e. to prevent avoiding missing a chip with the width of $t_c$. during the correlation. The choice $\Delta t=t_c/2$ is common for the delay search and also this spacing is chosen in order to avoid loss of correlation energy. The chip width is $t_c$. and thus the spacing should not be more than $t_c$ but to be sure that no correlation energy is lost the spacing is selected to $\Delta t=t_c/2$.

The doppler due to UE velocity is $f_{speed}=166$ Hz when travelling at v=100 km/h [3] and the carrier frequency is 1800 MHz. The allowed UE frequency offset adds frequency a uncertainty of $f_{off}=10^{-7}*f_c$Hz. Altogether the doppler uncertainty is $$f_{un}=2(f_{off}+f_{speed}) \quad (8)$$

Next an expression for the delay uncertainty is calculated. Consider the geometry in FIG. 3. It is known apriori that the UEs are located in a cell with radius $\Delta$. Assume that a signal is transmitted from UE at time t0.

If UE is at the location A in FIG. 3 then the signal arrives at LMU1 and LMU2 at times:

$$t1=t0+\Delta/c \quad (9)$$

$$t2=t0+(d+\Delta)/c \quad (10)$$

If UE is at the location B in FIG. 3 then the signal arrives at LMU1 and LMU2 at times:

$$t1=t0+\Delta/c \quad (11)$$

$$t2=t0+(d-\Delta)/c \quad (12)$$

Assume that LMU1 is the master LMU and that LMU1 is adapted to easily detect the signal arrival. Given t1, it is possible to predict the arrival time at LMU2 in order to minimize the code phase search.

Note that $$A: t2=t1-\Delta/c+(d+\Delta)/c=t1+d/c \quad (13)$$

$$B: t2=t1-\Delta/c+(d-\Delta)/c=t1+(d-2\Delta)/c \quad (14)$$

$$\text{Hence } t2 \in (t1+(d-2\Delta)/c, t1+d/c) \quad (15)$$

The width of the time of arrival uncertainty window is thus $$t_{un}=2\Delta/c \quad (16)$$

By summarizing this, the number of code phase bins $n_t=t_{un}/\Delta t$ and the number of doppler bins $n_f=f_{un}/\Delta f$ are received. This gives a total number of bins of $$N_{bins}=n_t \cdot n_f \quad (16a)$$

For a single bin the false alarm rate is $P_f$. For $N_{bins}$ bins we get $$P_{fLMU}=1-(1-P_f)^{N_{bins}} \sim N_{bins} \cdot P_f \quad (17)$$

for small $P_f$. Similarly the probability that at least one LMU out of $n_{LMU}$ make an incorrect decision is $$P_{fpos}=1-(1-P_{LMU})^{nLMU} \sim n_{LMU} N_{bins} P_f \quad (18)$$

The per bin $P_f$ can now be determined as $$P_f=P_{fpos}/(n_{LMU} N_{bins}) \quad (19)$$

Next an expression for the per bin false alarm rate is derived. It can be shown that for an incorrect (p,q), $2\lambda=2LR(p,q)/I$ has a $\chi^2$ distribution with 2M degrees of freedom. The false alarm rate, (ie probability that $\lambda>\lambda^*$ for an incorrect (p,q)) as a function of of $\lambda^*$ and M can therefore be calculated using standard numerical methods. In the examples that follow, the MATLAB function gammainc was used to define the false alarm rates as $$P_f=1-\text{gammainc}(\lambda^*, M) \quad (20)$$

The inverse problem, ie finding $\lambda$ for given $P_f$ and M was solved using linear interpolation of $\log(P_f)$ versus $\log(\lambda)$.

The movement of the UE limits the total measurement time. If the UE accelerates in such a way that the signal moves significantly far away from the delay/doppler bin during the acquisition then there is a risk that the signal is not detected. The doppler frequency relates to MS speed by $$f=f_c v/c \quad (21)$$

where $f_c$ is the carrier frequency $\sim$1800 MHz, v is the mobile speed and c is the speed of light. Hence $$\dot{f}=f_c \dot{v}/c \quad (22)$$

A test case in 3GPP TS 25.171 specifies a 90 degree turn in v=25km/h with a radius of r=20m, which results in doppler rate of change of approximately 14 Hz/s. In general, the following relationship is applied for other turning scenarios:

$$\dot{f}=f_c v^2/rc \quad (23)$$

According to one aspect of the present invention, a reasonable requirement is that the Doppler may change by at most $1/Lt_c$ within the measurement interval (in order to avoid loosening too much correlation energy as stated above), hence the requirement is that $$\dot{f}MLt_c<1/Lt_c \quad (24)$$

which results in that the maximum length L of the coherent detection for a given M is $$L=\frac{1}{\sqrt{M\dot{f}t_c}} \quad (25)$$

This gives the total measurement time $$t_{tot}<\sqrt{M/\dot{f}} \quad (26)$$

In addition the delay must not change more than $t_c$ (in order to avoid loosening too much correlation energy as stated above). The delay change requirement is then $$\dot{v}(MLt_c)^2/c<t_c \quad (27)$$

The total measurement time for signal detection is $$t_{tot}<\sqrt{ct_c/\dot{v}} \quad (28)$$

Thus it is shown that there is a maximum length L of the coherent detection interval of the coherent detection for a given M and that there is an optimal total measurement time for signal detection. The equations (24)-(26) give a first set of alternative condition on $t_{tot}$ and L and the equations (27)-(28) give a second set of alternative conditions on $t_{tot}$ and L. The equation that gives the smallest $t_{tot}$ should be used. I.e. if $t_{tot}$ of equation (26) is smaller than $t_{tot}$ of equation (28), then the equations (24)-(26) should be used.

Moreover, it is shown that the length L of the coherent detection and the total measurement time are dependent on the parameters cell size, UE speed and acceleration, number of participating LMUs and desired total false alarm rate. For the parameters chosen here, the doppler requirement (26) is the limiting factor.

By using the equations above, the relationships above are shown graphically in FIGS. 4a-4d. FIG. 4a shows the C/I threshold as a function of M by using equations (19)-(20) and the results of FIG. 4d. FIG. 4b shows the total measurement time as defined by equation (26). FIG. 4c shows the C/I threshold including the "processing gain" factor ML by using the results for FIG. 4a but adding L from eq (25). FIG. 4d shows the number of correlator search bins as a function of M according to equations 16a and 25.

From the graph in FIG. 4b it can be seen that the maximum coherent integration time $Lt_c$ is 0.26s (for M=1). For that integration length (M=1) the threshold C/I=−47.5 dB. By shortening the coherent integration time and resorting to non-coherent accumulations the total measurement time may be extended. FIG. 4b shows that the measurement time increases when M increases, but the gradient is lower than 1 which implies that L must decrease. By combining (25) and (26), it can be shown that $t_{tot}$=1($L \cdot t_c \cdot \dot{i}$). It should be noted that $t_{tot}$ is increased by a reduction of L.

The results in FIG. 4a show that the C/I threshold does not decrease monotonically as a function of measurement time, instead it reaches a minimum of C/I=−49.5 dB for the measurement time 0.8s (for this case the coherent integration time is 0.08 s and M=10), which show that there is an optimal choice of the total measurement time $t_{tot}$. The detection threshold for the optimal case is CML/I=15.5 dB.

By inspecting the graphs of FIGS. 4a-d, two important conclusions can be drawn. The optimum sensitivity is according to according to FIG. 4a (M=1) not achieved by selecting the coherent correlation interval as long as possible. Furthermore there is no point to increase the measurement time above a certain limit, which is shown in FIG. 4a. Rather one should use a combination of coherent and non-coherent correlation during the maximal total measurement time. Typically the non-coherent combining gain is 2 dB for each doubling of M (for low M) but decreases to less than 1 dB for higher M. In this case, the coherent correlation time $Lt_c$ is decreased when M increases wherein the loss due to shorter $Lt_c$ is higher than the gain due to increased M.

One approach, in practice, is to assume a predetermined maximal $t_{tot}$ and to use the equation (26) for determining M and then L. An alternative approach is to create the graph according to FIG. 4a in order to examine the combination of L and M giving the best sensitivity (i.e. the lowest C/I threshold) using the further condition that $t_{tot}$ is limited due to a limited maximal response time between the SMLC and the LMUs.

According to one embodiment of the present invention the means for detecting the signal is located in the LMU. According to a further embodiment the LMU comprises also means for selecting the number of coherent detection interval samples and/or the maximal total detection time. According to yet a further embodiment a Serving Mobile Location Centre comprises means for selecting the number of coherent detection interval samples and/or the maximal total detection time.

Hence the method and arrangements of the present invention provide a measurement strategy that maximizes the sensitivity of the LMU, which can be determined as a function of parameters like cell size, UE speed and acceleration, number of participating Location Measurements Units and desired total false alarm rate. These parameters are usually known at the time of LMU deployment. The cell size is obviously known whereas the acceleration and speed may e.g. be provided from test specifications such as 3GPP TS 25.171. "Performance Requirements for AGPS" or market requirements.

Accordingly, the method of the present invention shown in the flowchart of FIG. 5, comprises the step of:

501. Select one of the coherent correlation interval L and a total detection interval $t_{tot}$ based on at least one of the parameters cell size, UE speed and acceleration, number of participating Location Measurements Units and a desired total false alarm rate.

The method of the present invention may preferably be implemented by a computer program product. Thus the present invention relates to a computer program product directly loadable into a processing means in a LMU and or in a Serving Mobile Location Center (SMLC), comprising the software code means for performing the steps of said method.

The present invention also relates to a computer program product stored on a computer usable medium, comprising readable program for causing a processing means in a LMU and or in a Serving Mobile Location Center (SMLC), to control the execution of the steps of said method.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. An arrangement in a mobile telecommunication network for detection of a User Equipment (UE) transmitted signal, the arrangement comprising:
   means for detecting the signal during the time $t_{tot}$, wherein said means comprises a correlator configured to perform combined coherent and non-coherent correlation, wherein the length of the coherent correlation interval is L signal samples, the number of coherent correlation intervals is M and the coherent correlation results in a coherent correlation result for each of the coherent detection intervals M; and
   means for adding the coherent correlation results non-coherently, wherein selecting one of the length L of the coherent detection interval and the total detection interval $t_{tot}$ is based on the parameters cell size, UE speed and acceleration, number of participating Location Measurements Units (LMU), and a desired total false alarm rate.

2. The arrangement according claim 1, wherein the coherent correlation interval is based on at least one of the parameters cell size, UE speed and acceleration, number of participating LMUs and a desired total false alarm rate.

3. The arrangement according to claim 1, wherein the total detection interval $t_{tot}$ is based on at least one of the parameters cell size, UE speed and acceleration, number of participating LMUs and a desired total false alarm rate.

4. The arrangement according to claim 1, wherein the correlator is located in a LMU.

5. The arrangement according to claim 1, wherein the correlator is located in a Serving Mobile Location Center.

6. The arrangement according to claim 1, wherein the total detection interval $t_{tot}$ is a predetermined value.

7. The arrangement according to claim 6, wherein the predetermined value is dependent on a maximal allowed response time.

8. A method in a mobile telecommunication network for detection of a User Equipment (UE) transmitted signal, comprising the steps of:
   detecting the signal during the time $t_{tot}$, wherein said detection step comprises the steps of:
      combining a coherent and non-coherent correlation, wherein the length of the coherent correlation interval is L signal samples, the number of coherent correlation intervals is M and the coherent correlation results in a coherent correlation result for each of the coherent detection intervals M; and, adding the coherent correlation results non-coherently wherein the length L of the coherent detection interval and the total detection interval $t_{tot}$ are based on the parameters cell size, UE speed and acceleration, number of participating Location Measurements Units (LMU), and a desired total false alarm rate.

9. The method according claim 8, wherein the coherent correlation interval is based on at least one of the parameters cell size, UE speed and acceleration, number of participating LMUs and a desired total false alarm rate.

10. The method according to claim 8, wherein the total detection interval $t_{tot}$ is based on at least one of the parameters cell size, UE speed and acceleration, number of participating LMUs and a desired total false alarm rate.

11. The method according to claim 8, wherein the step of detecting is performed in a LMU.

* * * * *

UNITED STATES PATENT AND TRADEMARK OFFICE
CERTIFICATE OF CORRECTION

PATENT NO.       : 8,050,691 B2
APPLICATION NO.  : 12/063529
DATED            : November 1, 2011
INVENTOR(S)      : Kangas It is certified that error appears in the above-identified patent and that said Letters Patent is hereby corrected as shown below:

In Column 5, Line 6, delete "$\Delta t = t_o/2$" and insert -- $\Delta t = t_c/2$ --, therefor.

In Column 5, Line 10, delete "$\Delta t = t_o/2.$" and insert -- $\Delta t = t_c/2.$ --, therefor.

In Column 6, Line 4, in Equation (20), delete "$P_t = 1\text{-gammainc}(\lambda^*, M)$" and insert -- $P_f = 1\text{-gammainc}(\lambda^*, M)$ --, therefor.

In Column 6, Line 6, delete "$P_1$" and insert -- $P_f$ --, therefor.

In Column 6, Line 7, delete "$\log(P_t)$" and insert -- $\log(P_f)$ --, therefor.

Signed and Sealed this
Twenty-fourth Day of April, 2012

David J. Kappos
*Director of the United States Patent and Trademark Office*